(12) United States Patent
Lee et al.

(10) Patent No.: US 9,644,449 B2
(45) Date of Patent: May 9, 2017

(54) GEOTHERMAL INTEGRATED EXPANSION SPOOL ASSEMBLY

(71) Applicant: Cameron International Corporation, Houston, TX (US)

(72) Inventors: Jeffrey Michael Lee, Sugar Land, TX (US); Stuart Robinson, Katy, TX (US)

(73) Assignee: Cameron International Corporation, Houston, TX (US)

( * ) Notice: Subject to any disclaimer, the term of this patent is extended or adjusted under 35 U.S.C. 154(b) by 470 days.

(21) Appl. No.: 13/913,238

(22) Filed: Jun. 7, 2013

(65) Prior Publication Data

US 2014/0360735 A1 Dec. 11, 2014

(51) Int. Cl.
*E21B 34/02* (2006.01)
*E21B 33/03* (2006.01)
*E21B 33/04* (2006.01)
*F24J 3/08* (2006.01)

(52) U.S. Cl.
CPC .............. *E21B 34/02* (2013.01); *E21B 33/03* (2013.01); *F24J 3/08* (2013.01); *Y02E 10/10* (2013.01)

(58) Field of Classification Search
CPC ................................ E21B 33/03; E21B 33/04
See application file for complete search history.

(56) References Cited

U.S. PATENT DOCUMENTS

| | | | | |
|---|---|---|---|---|
| 2,313,308 A | * | 3/1943 | Allen | E21B 33/04 277/322 |
| 2,751,235 A | * | 6/1956 | Watts | E21B 33/0422 277/322 |
| 3,976,130 A | * | 8/1976 | Chambless | B60B 7/0086 166/173 |
| 4,512,410 A | | 4/1985 | Forester | |
| 4,972,904 A | * | 11/1990 | Godare | E21B 33/03 166/312 |
| 5,203,409 A | * | 4/1993 | Seid | E21B 33/04 166/95.1 |
| 5,615,739 A | * | 4/1997 | Dallas | E21B 33/03 166/306 |
| 2008/0087439 A1 | | 4/2008 | Dallas | |

OTHER PUBLICATIONS

PCT International Search Report and Written Opinion for PCT/US14/35939 mailed Feb. 25, 2015, 11 pages.

* cited by examiner

*Primary Examiner* — George Gray
(74) *Attorney, Agent, or Firm* — Fletcher Yoder, P.C.

(57) ABSTRACT

A geothermal expansion spool assembly includes an integrated or single piece configuration. The geothermal expansion spool assembly comprises an upper portion adapted to directly couple to a production valve and a lower portion adapted to surround and engage with a surface casing of a geothermal well, wherein the upper and lower portion are permanently fixed to one another.

17 Claims, 7 Drawing Sheets

GEOTHERMAL INTEGRATED EXPANSION SPOOL ASSEMBLY

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Geothermal wells are drilled subterranean wells that produce fluids, such as water or steam, which are heated by the natural temperature of the Earth. For example, the fluids produced by a geothermal well may be used directly in a power generation application or system, such as a steam turbine. Additionally, geothermal wells may be used as a geothermal heat pump. That is, Earth may be used as a heat source or a heat sink, and fluids may be circulated through conduits positioned beneath the Earth's surface to heat or cool the fluids for subsequent use at the surface. Unfortunately, exiting equipment used in geothermal wells may not be well-suited for geothermal well-specific applications.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention include an integrated expansion spool assembly that couples directly to a surface casing of a geothermal well system and a production valve of the geothermal well system. Specifically, the integrated expansion spool assembly may include a lower portion that may be welded to the surface casing and an upper portion that is directly coupled (e.g., bolted) to the production valve, where the upper and lower portions form an integrated assembly. That is, the upper and lower portions of the expansion spool assembly may form a single piece or one-piece structure, a permanently fixed or coupled assembly, or be integral with one another. For example, the upper and lower portions may be welded together or cast as a single piece or one-piece structure. As a result, the integrated expansion spool assembly may not include permanent seals, seal pack offs, or other connections that may increase the length, complexity, and/or cost of the spool.

Figure 1:
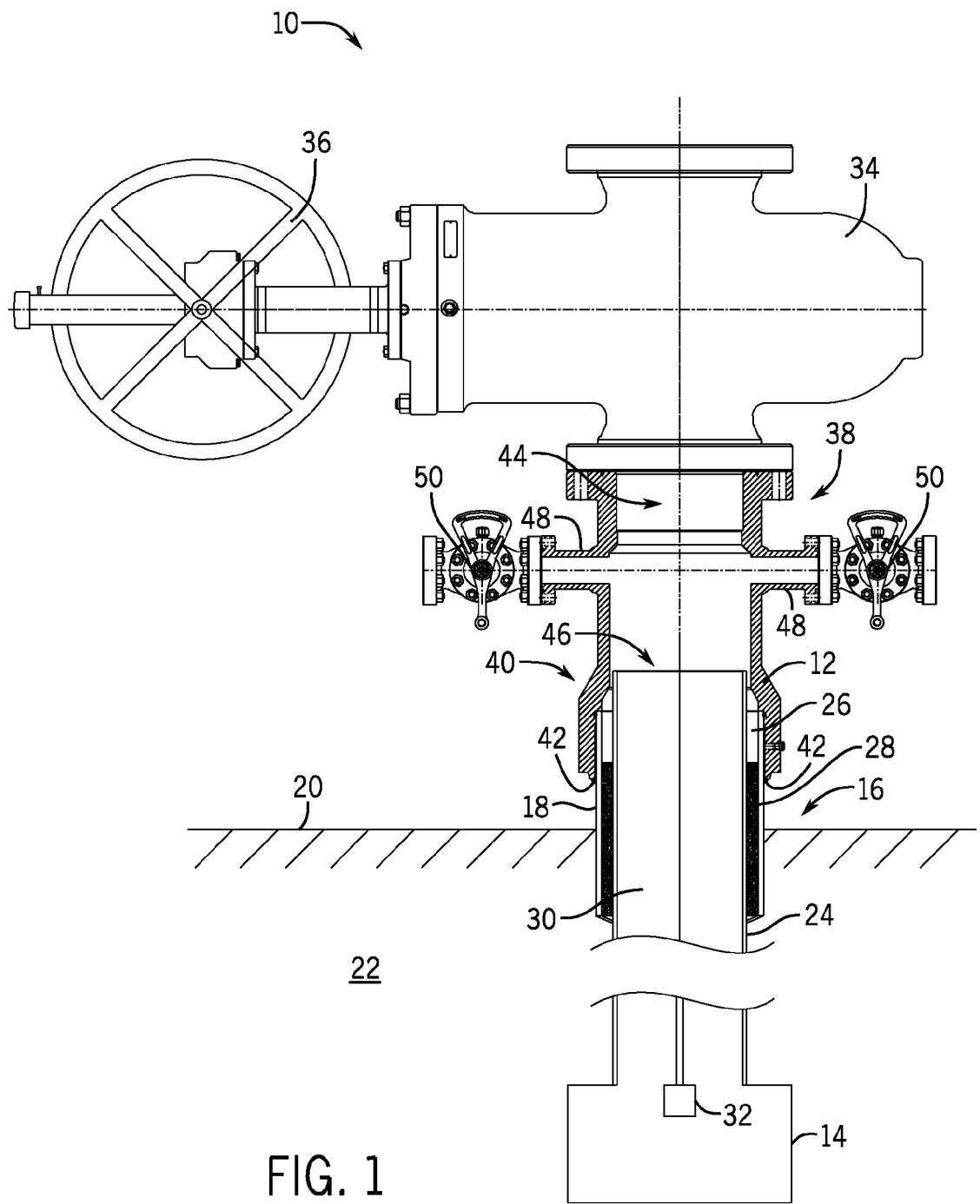
FIG. 1 is a schematic illustration of an embodiment of a geothermal well system having an integrated expansion spool assembly.

FIG. 1 is a block diagram that illustrates an embodiment of a geothermal well system 10 having an integrated expansion spool assembly 12. The illustrated geothermal well system 10 can be configured to extract various fluids, including water and steam, or configured to inject fluids into the earth. In some embodiments, the geothermal well system 10 may extract heated water or steam that has been heated by the natural temperature of the earth. When the water or steam is extracted from the earth, it may be used for power generation or other applications. As illustrated, the system 10 includes the integrated expansion spool assembly 12 coupled to a subterranean reservoir 14 via a well 16. The well 16 is generally comprised of a series of concentric tubes or casing strings. Specifically, a surface casing 18 extends from a surface 20 of the earth to a subterranean formation 22 beneath the surface 20. Within the surface casing 18, a production casing 24 extends down to the subterranean reservoir 14 to provide access to the fluids (e.g., water and/or steam) within the subterranean reservoir 14. An annulus 26 between the surface casing 18 and the production casing 24 may be filled with cement 28 to couple or fix the production casing 24 to the surface casing 18. Ultimately, fluid in the subterranean reservoir 14 is produced to the surface 20 through a well bore 30 of the production casing 24. In certain embodiments, an artificial lift device, such as a pump 32, may be located in the production casing 24 to bias the fluid toward the surface 20. An articulated rod, such as a polished rod, may be linearly or rotationally actuated to motivate a pumping mechanism.

The geothermal well system 10 further includes a production valve 34 coupled to the integrated expansion spool assembly 12. The production valve 34 provides a sealable connection to the wellbore 30 of the production casing 24 and regulates flow of the fluid produced or injected into the well 16 at the surface 20 of the system 10. In certain embodiments, the production valve 34 may be manually actuated by a valve wheel 36, while in other embodiments the production valve 34 may be automatically operated by an actuator or drive (e.g., an electric motor, a hydraulic actuator, etc.).

As mentioned above, the geothermal well system 10 includes the integrated expansion spool assembly 12. The integrated expansion spool assembly 12 may be coupled to multiple components that control and regulate activities and conditions associated with the well 16. For example, the wellhead assembly 12 may generally be coupled to (or may include) bodies, spools, and valves that route produced fluids from the subterranean reservoir 14, provide for regulating pressure in the well 16, and provide for the injection of fluids into the well bore 30.

Furthermore, in the illustrated embodiment, the integrated expansion spool assembly 12 includes an upper portion 38 (e.g., annular wall) and a lower portion 40 (e.g., annular wall). As shown, the upper portion 38 is directly coupled to the production valve 34, and the lower portion 40 is directly coupled to the surface casing 18 of the geothermal well system 10. For example, the upper portion 38 may be coupled to the production valve 34 via fasteners (e.g., bolts), welds or other fixed joints, or other coupling mechanism. Similarly, the lower portion 40 may be coupled to the surface casing 18 by one or more welds 42 or other fixed joints. Moreover, the upper portion 38 (e.g., annular wall) has a first bore 44 and the lower portion 40 (e.g., annular wall) has a second bore 46. The first and second bores 44 and 46 are fluidly coupled to one another and provide access to the well bore 30 of the production casing 24. Moreover, the upper and lower portions 38 and 40 are integral with one another. In other words, the upper portion 38 and the lower portion 40 of the integrated expansion spool assembly 12 may be a single piece (e.g., one-piece structure) and/or may be permanently fixed to one another. For example, the upper portion 48 and the lower portion 40 of the integrated expansion spool assembly 12 may be cast as a single unit, welded together to form a single unit, etc. As a result, the integrated expansion spool assembly 12 may not include permanent seals (e.g., a seal pack off) other than seals used to test weld connections of the integrated expansion spool assembly 12. In this manner, the overall length, complexity, and cost of the geothermal well system 10 may be reduced.

In the illustrated embodiment, the integrated expansion spool assembly 12 further includes side ports (e.g., inlets or outlets) 48 having valves 50 to provide fluid connections to the first and second bores 44 and 46 of the integrated expansion spool assembly 12. Thus, the ports 48 may be in fluid communication with the well bore 30 and, as such, provide access to the subterranean reservoir 14. For example, the ports 48 may enable the pumping of cement into the well bore 30, well control, or other operation. The ports 48 may also be integral with the integrated expansion spool assembly 12. That is, the ports 48 may form a single, integrated piece with the upper and lower portions 38 and 40 of the integrated expansion spool assembly 12. For example, the ports 38 may be welded, cast, or otherwise permanently fixed with the upper and lower portions 38 and 40 to form the integrated expansion spool assembly 12. Additionally, the valves 50 may be either fixed or removably coupled (e.g., via bolts) to the ports 48.

Figure 2:
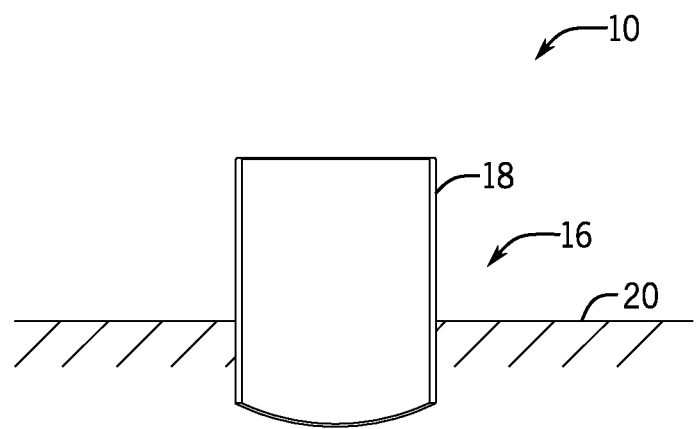
FIGS. 2-9 are schematic illustrations of a method of installing a geothermal well system having an integrated expansion spool assembly.
Figure 3:
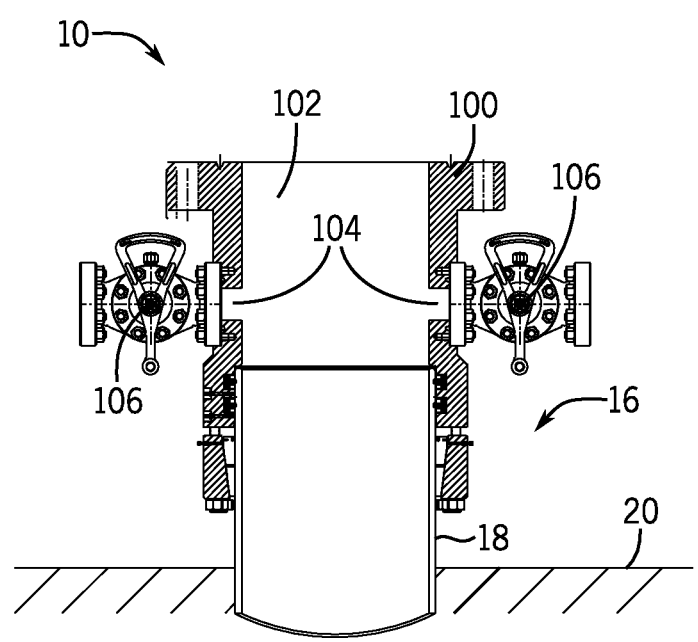

FIGS. 2-9 are schematic illustrations of a method of installing the geothermal well system 10 having the integrated expansion spool assembly 12. First, FIG. 2 illustrates the surface casing 18, which is cut and run into the surface 20 of the earth. As mentioned above, the surface casing 18 may be the outermost casing surrounding the well bore 30. However, in other embodiments, the geothermal well system 10 may include other or additional layers of casing. After the surface casing 18 is positioned and run through the surface 20 of the earth, a drilling adapter 100 is positioned and secured about a surface outlet of the surface casing 18, as shown in FIG. 3. For example, the drilling adapter 100 may be secured to the surface casing 18 by mechanical fasteners (e.g., bolts) or by welding. The drilling adapter 100 includes a bore 102 through which a drilling tool or other tool may be inserted to complete a drilling process to create the well 16. Additionally, the drilling adapter 100 includes side ports 104 having valves 106, which are also fluidly coupled to the bore 102. The side ports 104 and valves 106 may be used to supply cement, chemicals, or other fluids that may be used during the drilling process. The side ports 104 and valves 106 may also be used for other well control applications during the drilling process.

Figure 4:
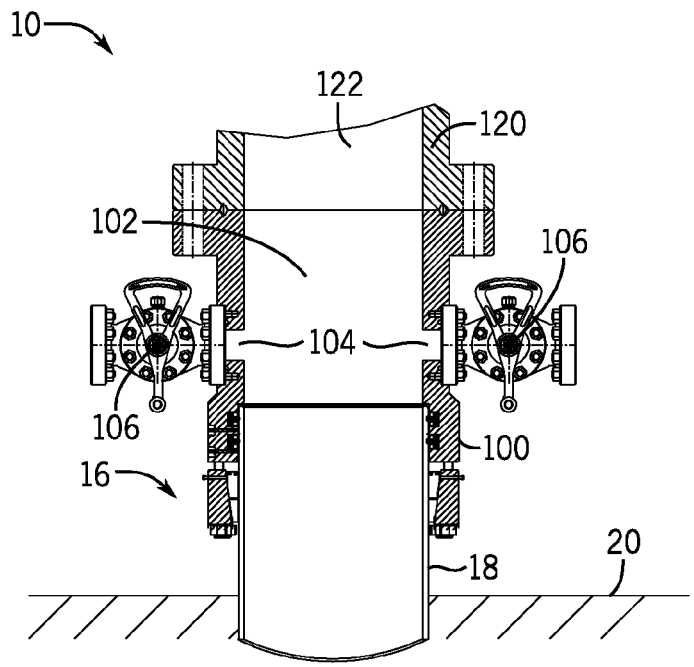

After the drilling adapter 100 is positioned and secured to the surface casing 18, a blow out preventer 120 is secured to an end of the drilling adapter 100 opposite the surface casing 18, as shown in FIG. 4. For example, the blow out preventer 120 may be secured to the end of the drilling adapter 100 by bolts (e.g., threaded bolts) or other mechanical fasteners. As will be appreciated, the blow out preventer 120 may be configured to block undesired release of pressure, fluid, or other material within the well 16 during the drilling process. Additionally, the blow out preventer 120 includes a bore 122 that is fluidly coupled to the bore 120 of the drilling adapter 100 when the blow out preventer 120 and the drilling adapter 100 are installed. As such, a drilling tool may be run through the bore 122 of the blow out preventer 120 and the bore 102 of the drilling adapter 100 to complete a drilling process beneath the surface 20 of the earth.

Figure 5:
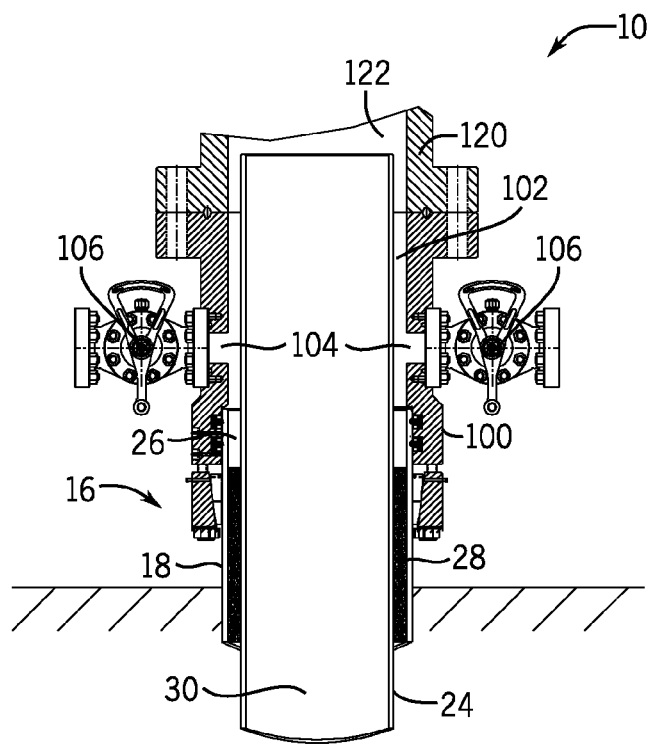

After or while the drilling process is completed, the production casing 24 may be run into the well 16 and secured in place, as shown in FIG. 5. Specifically, the production casing 24 is run through the bore 122 of the blow out preventer 120 and the bore 102 of the drilling adapter 100 to be positioned into the well 16 beneath the surface 20. As mentioned above, once the production casing 24 is in place, the production casing 24 may be fixed in place with cement 28. For example, the cement 28 may be pumped into the well bore 30 through the ports 104 of the drilling adapter 100.

Figure 6:
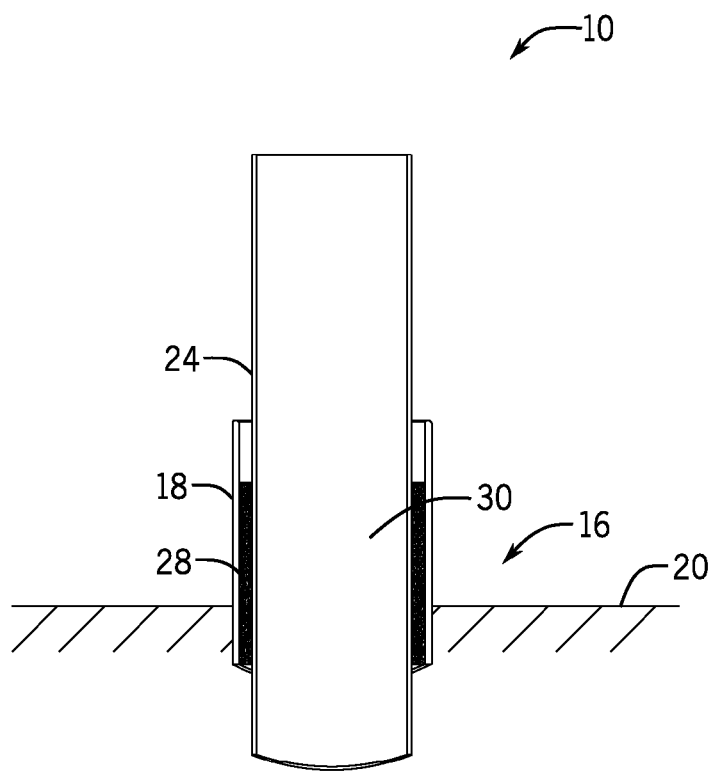
Figure 7:
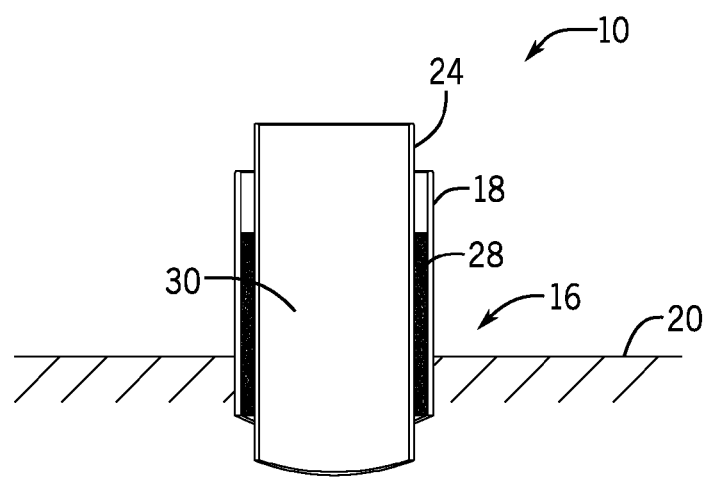

When the drilling process is complete and the production casing 24 is landed and secured within the well 16 and the surface casing 18, the blow out preventer 120 and the drilling adapter 100 are removed, as shown in FIG. 6. Subsequently, the production casing 24 may be cut, as shown in FIG. 7, to reduce the length of the production casing 24 extending above the surface 20.

Figure 8:
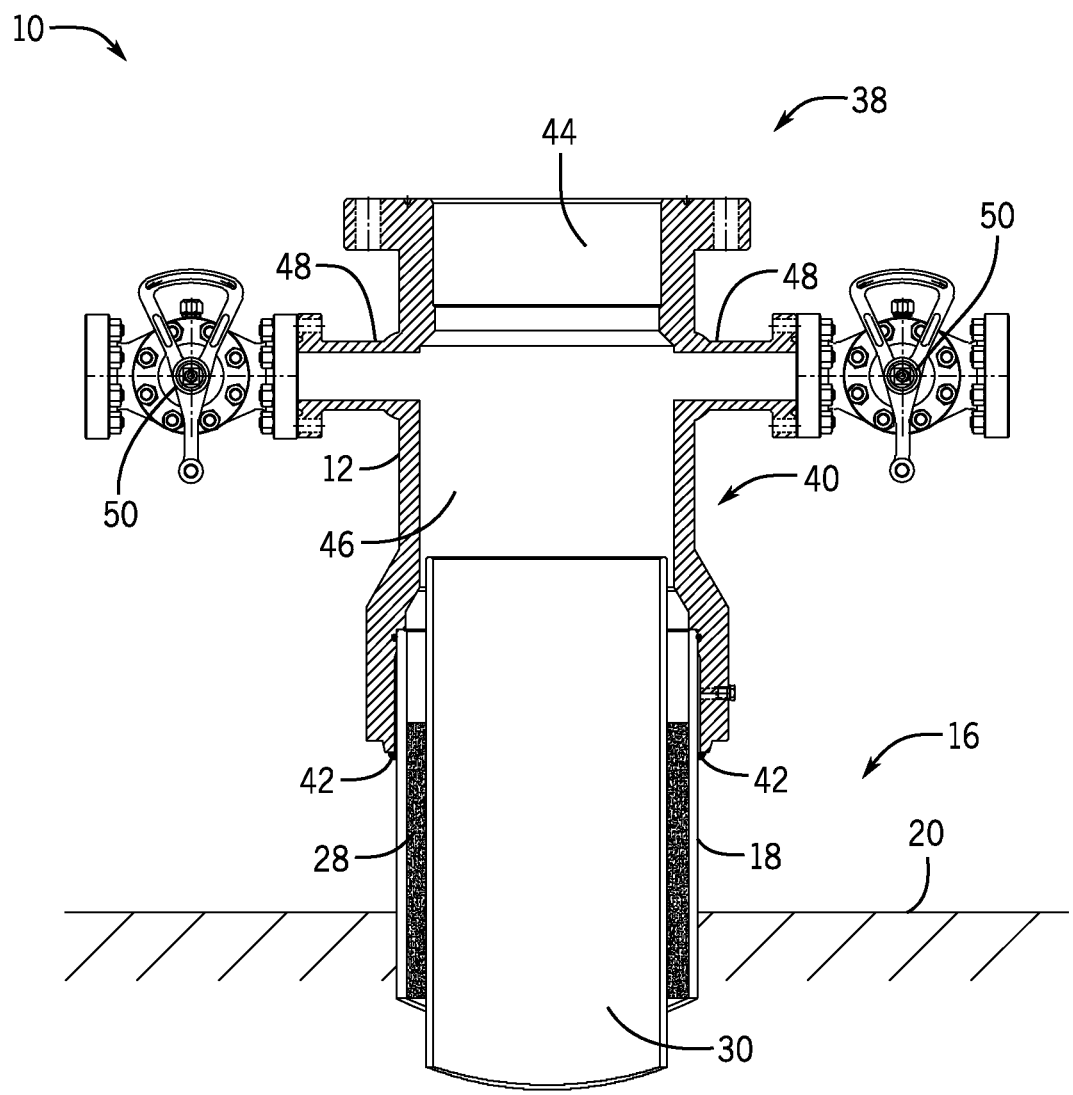
Figure 9:
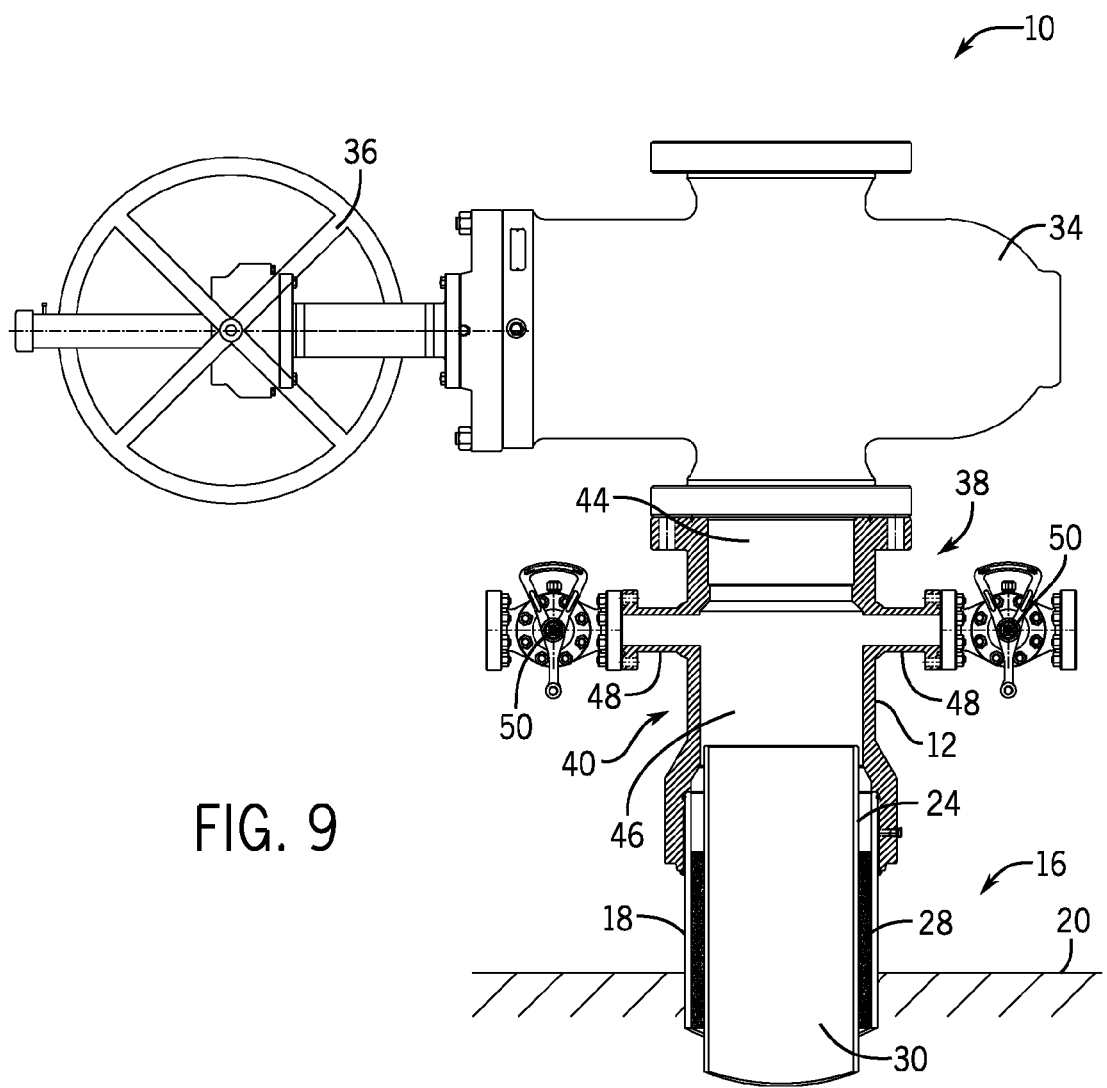

After the production casing 24 is cut to a desired height or length, the integrated expansion spool assembly 12 may be installed above the production casing 24 and the surface casing 18, as shown in FIG. 8. More specifically, the lower portion 40 of the integrated expansion spool assembly 12 may be secured or fixed directly to the surface casing 18 of the geothermal well system 10. As mentioned above, the lower portion 40 of the integrated expansion spool assembly 12 may be welded (e.g., via welds 42) or otherwise fixedly secured to the surface casing 18 of the geothermal well system 10. Thereafter, in the manner described below, the welds 42 (or fixed joints) may be tested to verify the integrity and quality of the welds 42 securing the integrated expansion spool assembly 12 to the surface casing 18.

As discussed in detail above, the integrated expansion spool assembly 12 may be an integral or one-piece unit. That is, the upper and lower portions 38 and 40 of the integrated expansion spool assembly 12 may be permanently fixed to one another. For example, the integrated expansion spool assembly 12 may be cast as a single unit or welded to form a single piece. Additionally, the side ports 48 of the integrated expansion spool assembly 12 may also be cast together or welded to the upper and lower portions 38 and 40 to form the integrated expansion spool assembly 12.

As the upper and lower portions 38 and 40 of the integrated expansion spool assembly 12 form a single piece, the upper and lower portions 38 and 40 may not include flanges, seals, or seal pack offs that may require testing, maintenance, replacement, and so forth. As a result, the integrated expansion spool assembly 12 may contribute to a reduction in costs and maintenance of the geothermal well system 10. Additionally, the integral or single piece configuration of the integrated expansion spool assembly 12 may reduce the overall height of the geothermal well system 10 above the surface 20, which may facilitate improved and/or easier operation of the geothermal well system 10.

After the integrated expansion spool assembly 12 is installed and secured to the surface casing 18, the production valve 34 may be installed and secured to the integrated expansion spool assembly 12, as shown in FIG. 8. For example, the production valve 34 may be secured directly to the upper portion 38 of the integrated expansion spool assembly 12 by threaded bolts or other mechanical fasteners. As mentioned above, the production valve 34 is configured to regulate flow of a fluid from the well 16 and/or into the well 16. For example, the production valve 34 may include a valve wheel 36 to enable manual actuation of the production valve 34. Additionally or alternatively, the production valve 34 may be configured for automatic actuation by a drive (e.g., electric motor, hydraulic actuator, etc.).

Figure 10:
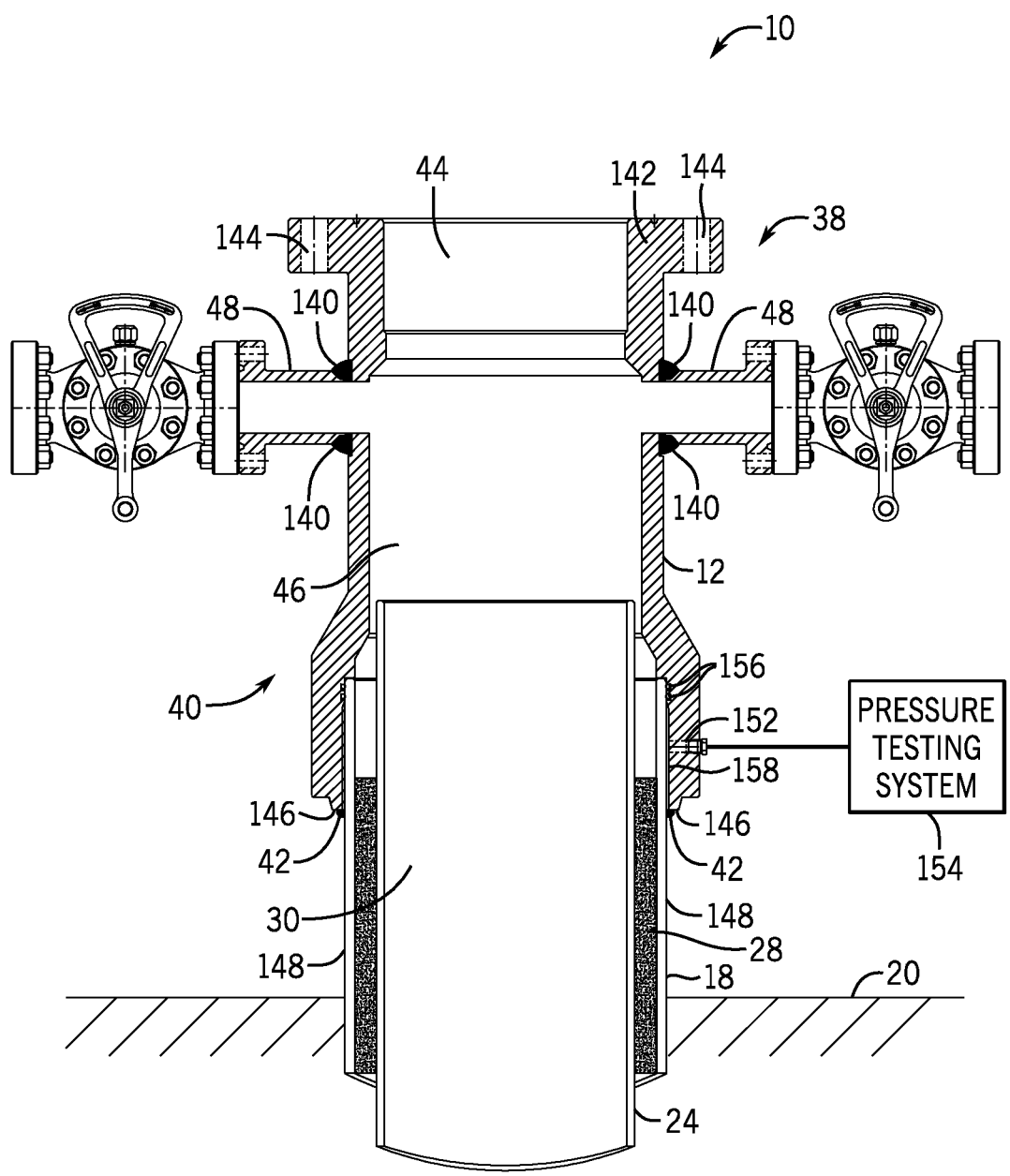
FIG. 10 is a schematic illustrating of an embodiment of a geothermal well system having an integrated expansion spool assembly.

FIG. 10 is a schematic illustration of an embodiment of the geothermal well system 10 having the integrated expansion spool assembly 12, illustrating the integrated expansion spool assembly 12 welded directly to the surface casing 18 via welds 42. As discussed in detail above, the integrated expansion spool assembly 12 has an integral or one piece configuration. In the illustrated embodiment, the upper and lower portions 38 and 40 and the side ports 48 of the integrated expansion spool assembly 12 are permanently fixed (e.g., integrated) to one another by welds 140. Additionally, the upper portion 38 of the integrated expansion spool assembly 12 includes a flange 142 configured to couple directly to the production valve 34. The flange 142 further includes apertures 144, which may include threads, for receiving mechanical fasteners (e.g., bolts) to secure the production valve 34 directly to the upper portion 38.

Furthermore, as similarly discussed above, the lower portion 40 of the integrated expansion spool assembly 12 may be secured to the surface casing 18 of the well 16. For example, in the illustrated embodiment, welds 42 are used to secure an axial end or lip 146 of the lower portion 40 to an outer surface 148 of the surface casing 18. As mentioned above, after the lower portion 40 of the integrated expansion spool assembly 12 is secured directly to the surface casing 18 via welds 42, the integrity or quality of the welds 42 may be tested and/or verified. For example, in certain embodiments, the welds 42 may be pressure tested. In the illustrated embodiment, the lower portion 40 of the integrated expansion spool assembly 12 includes a pressure testing port 152, which may be coupled to a pressure testing system 154. The pressure testing system 154 may include components such as a pressurized gas source, a pressurized liquid source, a pump, a compressor, valves, gauges, or other instrumentation to test the integrity or quality of the welds 42 (e.g., weld seals).

The lower portion 40 of the integrated expansion spool assembly 12 also includes pressure testing seals (e.g., O-ring seals) 156. Specifically, the pressure testing seals 156 are disposed between the surface casing 18 and the lower portion 40 of the integrated expansion spool assembly 12 when the integrated expansion spool assembly 12 is installed over the surface casing 18. Additionally, the pressure testing seals 156 are disposed on a side of the pressure testing port 152 axially opposite the welds 42. As a result, a cavity 158 (e.g., annular cavity) may be formed between the pressure testing seals 156, the weld 42, the lower portion 40 of the integrated spool assembly 12 and the surface casing 18. Thereafter, the pressure testing system 154 may pressurize the cavity 158 and thereby test the seal of the weld 42.

As discussed in detail above, the present embodiments are directed towards the integrated expansion spool assembly 12 for the geothermal well system 10. Specifically, the integrated expansion spool assembly 12 may have an integrated or single piece configuration. For example, the integrated expansion spool assembly 12 may include the upper portion 38 configured to directly couple to the production valve 34 and the lower portion 40 configured to directly couple to the well 16 (e.g., to the surface casing 18 of the well 16). Furthermore, the upper and lower portions 38 and 40 may be permanently fixed to one another. For example, the upper and lower portions 38 and 40 may be cast as a single piece or welded to one another to form a single piece (e.g., by welds 140). In certain embodiments, the integrated expansion spool assembly 12 may include other components, which may be permanently fixed or removably coupled to the upper and lower portions 38 and 40, such as side ports 48.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A geothermal well system, comprising
an expansion spool assembly having a lower portion and an upper portion, wherein the lower portion and upper portion form a permanently fixed unit,
wherein the upper portion comprises a flange configured to couple to a production valve;
wherein the lower portion comprises a lip configured to couple to a surface casing of the geothermal well system; and
wherein the lower portion comprises a pressure testing port configured to receive a pressurized fluid flow to test a weld coupling the lip to the surface casing.

2. The geothermal well system of claim 1, wherein the expansion spool assembly comprises at least one side port.

3. The geothermal well system of claim 2, wherein the at least one side port is permanently fixed to the upper portion and the lower portion.

4. The geothermal well system of claim 3, wherein the at least one side port is welded to the upper portion and the lower portion.

5. The geothermal well system of claim 1, wherein the upper and lower portions are cast together as a single unit.

6. The geothermal well system of claim 1, wherein the upper and lower portions are welded to one another.

7. The geothermal well system of claim 1, wherein the lower portion comprises a pressure testing seal disposed on a side of the pressure testing port axially opposite the lip.

8. The geothermal well system of claim 1, wherein the upper portion comprises a first bore, the lower portion comprises a second bore, and the first and second bores are fluidly coupled to one another and are configured to pass a tool.

9. A system, comprising:
a geothermal expansion spool assembly, comprising:
an upper portion adapted to couple to a production valve; and
a lower portion adapted to surround and directly engage with a surface casing of a geothermal well, wherein the upper and lower portion are a single piece; and wherein the lower portion comprises an axial end welded to the surface casing.

10. The system of claim 9, wherein the upper portion and the lower portion are welded to one another.

11. The system of claim 9, wherein the upper portion comprises a first bore, the lower portion comprises a second bore, the first and second bores are fluidly coupled to one another, and the first and second bores are configured to flow a fluid between the geothermal well and the production valve.

12. The system of claim 11, wherein the geothermal expansion spool assembly comprises a side port in fluid communication with the first bore and the second bore.

13. The system of claim 12, wherein the side port comprises a valve configured to regulate fluid flow through the side port.

14. The system of claim 9, wherein the upper portion comprises a flange mechanically coupled to the production valve.

15. A method, comprising: landing a surface casing of a geothermal well system in a surface of the earth; coupling a one-piece geothermal expansion spool directly to the surface casing; and
coupling a production valve directly to the one-piece geothermal expansion spool; and
wherein coupling the one-piece expansion spool directly to the surface casing comprises welding an axial lip of the geothermal expansion spool to an outer surface of the surface casing.

16. The method of claim 15, comprising testing a seal of a weld between the axial lip of the geothermal expansion spool and the outer surface of the surface casing by pressurizing a cavity between the weld, the outer surface of the surface casing, the geothermal expansion spool, and a pressure testing seal of the geothermal expansion spool.

17. The method of claim 15, wherein coupling the production valve directly to the one-piece geothermal expansion spool comprises bolting the production valve to a flange of the geothermal expansion spool.

* * * * *